United States Patent
Hojo et al.

[11] Patent Number: 6,028,832
[45] Date of Patent: Feb. 22, 2000

[54] RECORDING MEDIUM LOADING APPARATUS FOR USE IN A RECORDING AND/OR REPRODUCING APPARATUS

[75] Inventors: Atsushi Hojo, Nara; Takashi Torii, Osaka; Shunji Tatano, Hirakata; Tomotaka Orita, Hirakata; Kiyonori Ishida, Hirakata, all of Japan

[73] Assignee: Matsushita Electric Industrial Co., Ltd., Kadoma, Japan

[21] Appl. No.: 08/837,465

[22] Filed: Apr. 18, 1997

[30] Foreign Application Priority Data

Apr. 19, 1996 [JP] Japan .................................. 8-098262

[51] Int. Cl.[7] .................................................. G11B 33/02
[52] U.S. Cl. .................................... 369/77.1; 369/75.2
[58] Field of Search ................................ 360/97, 98, 99, 360/133, 86, 99.06, 96.5, 96.6, 99.05; 369/77.2, 75.1, 75.2, 77.1, 291, 79, 270, 271

[56] References Cited

U.S. PATENT DOCUMENTS

| | | | |
|---|---|---|---|
| 3,899,794 | 8/1975 | Brown, Jr. ............................. | 360/133 |
| 4,032,971 | 6/1977 | Camerik ............................... | 358/128 |
| 4,368,495 | 1/1983 | Hamanaka et al. ................... | 360/97 |
| 4,539,669 | 9/1985 | Miyakawa et al. .................. | 369/75.2 |
| 4,669,076 | 5/1987 | Broom et al. ....................... | 369/77.1 |
| 4,688,125 | 8/1987 | Nomoto et al. ..................... | 360/99 |
| 4,815,066 | 3/1989 | Horvath .............................. | 369/79 |
| 5,058,094 | 10/1991 | Suzuki ............................... | 369/77.1 |
| 5,065,004 | 11/1991 | Mizuno et al. ..................... | 235/479 |
| 5,341,357 | 8/1994 | Mukawa et al. ................... | 369/75.2 |
| 5,381,393 | 1/1995 | Ohtani ............................... | 369/77.2 |
| 5,457,677 | 10/1995 | Yamashita et al. ................ | 369/289 |
| 5,517,478 | 5/1996 | Park .................................. | 369/77.2 |

FOREIGN PATENT DOCUMENTS

| | | |
|---|---|---|
| 3-041659 | 2/1991 | Japan . |
| 7-73565 | 3/1995 | Japan . |
| 7-249250 | 9/1995 | Japan . |

*Primary Examiner*—Stuart S. Levy
*Assistant Examiner*—Kenneth W Fields
*Attorney, Agent, or Firm*—Wenderoth, Lind & Ponack, L.L.P.

[57] ABSTRACT

A recording medium loading apparatus has a recording/reproducing mechanism fixedly arranged in a horizontal posture, a lid body disposed in a generally vertical posture in front of a main body, and a guide mechanism for positioning the tray, in association with the opening/closure of the lid body, just above the lid body to load the recording medium when the lid is in the open state and at a position where the recording medium is mounted on the recording/reproducing mechanism to be played when the lid is in the closed state, thereby achieving inexpensive, compact and high-quality operating with high reliability without using a motor.

6 Claims, 7 Drawing Sheets

RECORDING MEDIUM LOADING APPARATUS FOR USE IN A RECORDING AND/OR REPRODUCING APPARATUS

BACKGROUND OF THE INVENTION

1. Field of the Invention

The present invention relates to a recording medium loading apparatus, and in particular to a disc loading apparatus for detachably loading a disc in a recording and/or reproducing apparatus, compatible for either of a mini disc (referred to as, "MD" hereinafter) and a compact disc (referred to as "CD" hereinafter) or the like, serving as a data recording medium for music, video, code data, and the like.

2. Description of the Prior Art

Conventionally, CD and MD have been popularly used as an optical disc data recording medium mainly for recording and reproducing music and the like data. In recent years, a digital video disc (DVD) has been also developed as an optical disc data recording medium capable of easily recording data thereon. With the development of these discs, many types of disc loading apparatuses for use in recording and/or reproducing apparatuses have been also proposed heretofore. The following describes an example of a conventional disc loading apparatus with reference to FIG. 12.

In this type of a conventional disc loading apparatus shown in FIG. 12, when a disc is to be transferred from a play position in a disc-clamping condition to a loading position in a disc-unclamping condition, a tray 103 carrying the disc is first raised vertically and detached from a drive unit 102 and a control unit 101 by link members 107a through 107d and parallel links 108a and 108b, and subsequently the tray 103 is horizontally transferred outward by a roller 109 and a spring 106.

In this conventional construction, the tray is moved both in the vertical direction and in the horizontal direction to take out the disc, that is, the moving operation of the tray is required to be switched-between the vertical and horizontal directions. Moreover, since the operation in each direction is a parallel movement of components, guide members for guiding the tray should be strictly-defined in order to smoothly move the tray, which results in increment of the moving distance of the tray in amount as a whole. Therefore, it is difficult to drive the tray merely by the spring. In other words, a motor is needed to drive the tray. Eventually, the number of parts of the loading apparatus is undesirably increased and the structure thereof becomes complicated. The above fact results in increasing the size and weight of the apparatus as well as increasing the cost, contradictory to the current tendency towards simple construction with low-cost and compact size.

SUMMARY OF THE INVENTION

The present invention has for its essential objective to provide an inexpensive and compact loading apparatus which can be driven without using a motor for driving a tray.

In order to achieve the aforementioned objective, a loading apparatus for loading a recording medium used in a recording and/or reproducing apparatus having a horizontally arranged recording and/or reproducing mechanism.

The loading apparatus includes
a tray for carrying the recording medium placed thereon and thereby moving the recording medium between a loading position where the recording medium is to be loaded and a play position where the recording medium is to be played for recording and/or reproducing operation.

A rotatable lid body is disposed in front of the recording and/or reproducing mechanism in a main body of the recording and reproducing apparatus in a generally vertical posture when in its closed state and in a generally horizontal posture when in its opened state.

Also, a guide mechanism is provided for guiding the tray, in association with the opening/closing movement of the lid body, between the loading position when the lid body is in the open state and the play position when the lid body is in the closed state.

The guide mechanism guides the tray so that the loading position is located just above the lid body in its open state while the play position is located just above the recording and/or reproducing mechanism where the recording medium is to be mounted thereon.

The guide mechanism comprises a first and second supporting parts formed on the tray, a first engaging part formed in the lid body for engaging with the first supporting part in a pivotally rotatable manner and thereby interlocking the tray with the rotation of the lid body, and a second engaging part integral with the main body and guiding the second supporting part in a slidably movable manner. The second engaging part and the second supporting part are held in such a relation of relative movement as to regulate the tray in an arc-shaped locus in correspondence to a locus of the first engaging part and the first supporting part subsequent to the rotation of the lid body while maintaining the tray in a substantially horizontal posture to load the recording medium onto the recording and reproducing mechanism.

By this arrangement, the tray can be transferred while being controlled to keep the nearly horizontal posture to be over the lid body to load the disc when the lid body is open and to the play position where the disc is set on the recording/reproducing mechanism to be played when the lid is closed.

According to another feature of the present invention, the supporting part guide mechanism provided in the tray is formed of a roughly arc-shaped groove, while the second engaging part provided in the main body is a shaft fitted in the groove thereby to be guided in the sliding movement thereof. The arc-shaped groove curves in an opposite direction to the arc-shaped locus of the first engaging part defined by the-rotation of the lid body. When the lid body is opened, a rear end of the tray is moved higher than a front end thereof in the initial stage of the operation, so that an interference between a movement locus of a clamp hole of the disc and the turntable of the recording/reproducing mechanism is regulated, with the effect that the disc is smoothly loaded and detached.

According to further another feature of the present invention, the supporting part guide mechanism provided in the tray is a shaft while the second engaging part formed in the main body is an arc-shaped groove guided by the shaft. The arc-shaped groove curves in the same direction as and nearly approximate to the arc-shaped locus of the first engaging part defined by the rotation of the lid body. By this arrangement, the tray slides schematically parallel without forcing a resistance between the groove and the shaft, and the tray is allowed to move smoothly.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

First Embodiment

The following describes a disc loading apparatus in accordance with a first embodiment of the present invention with reference to FIGS. 1 through 10.

Figure 1:
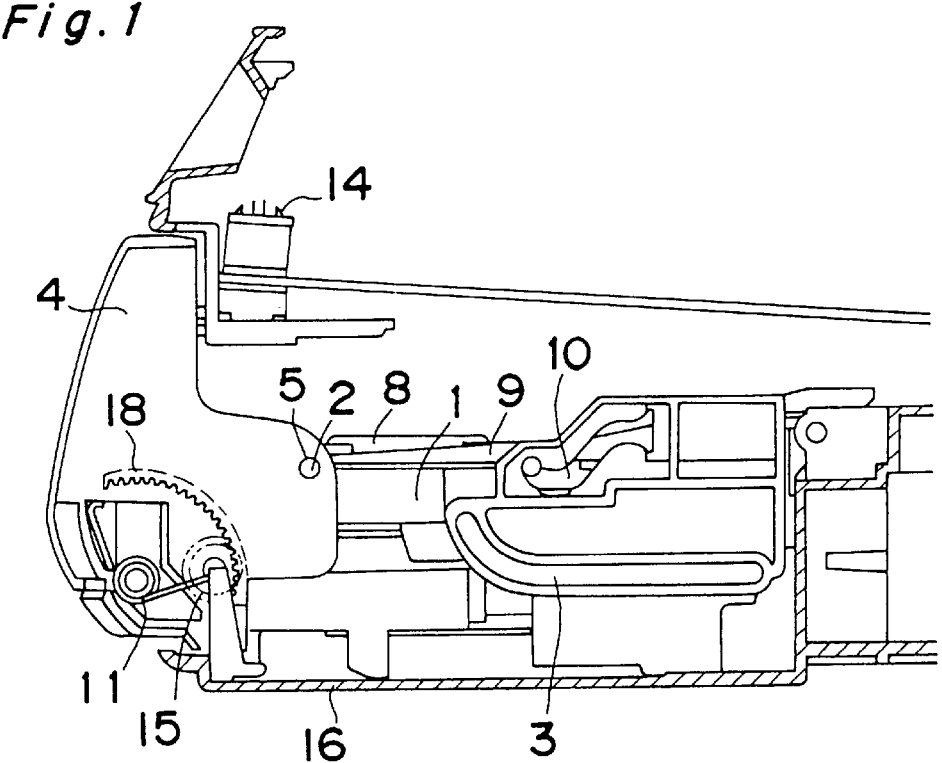
FIG. 1 is a side view of a loading device according to a first embodiment of the present invention in a state with a lid body closed.
Figure 2:
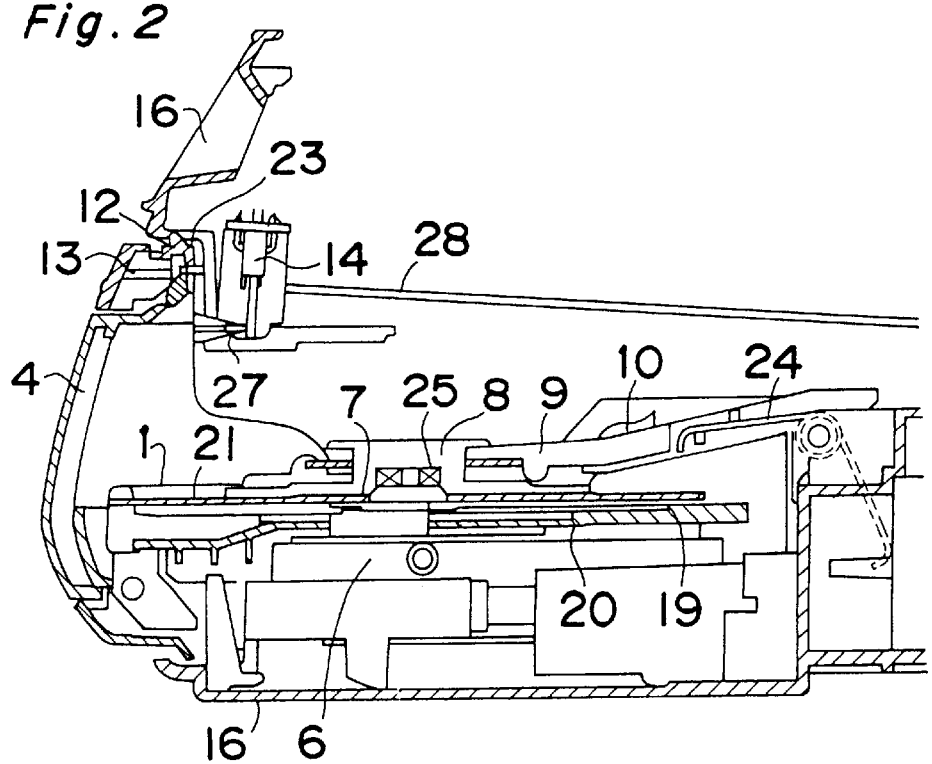
FIG. 2 is a sectional view at the center of the loading device of FIG. 1.
Figure 3:
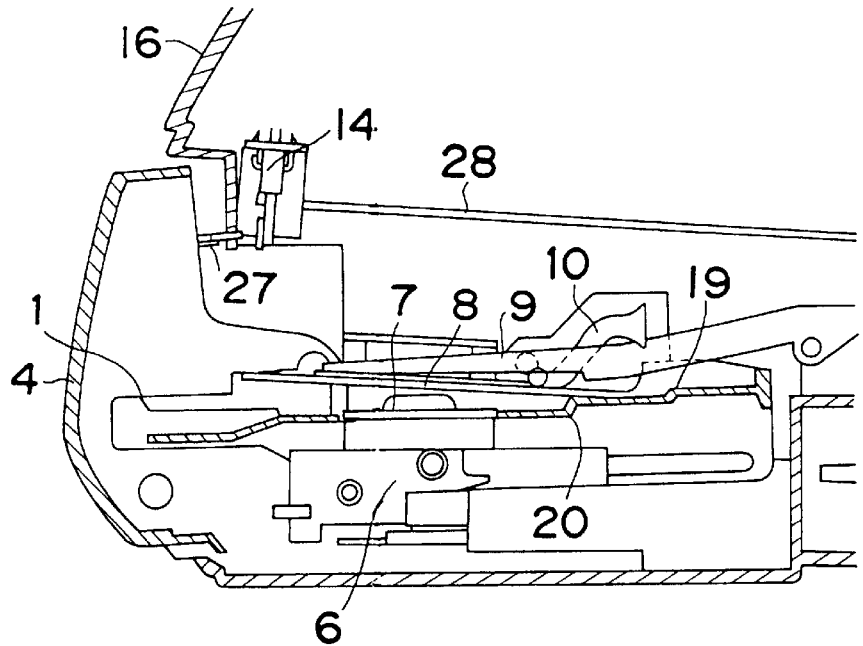
FIG. 3 is a sectional view when a clamper is raised in the loading device.
Figure 4:
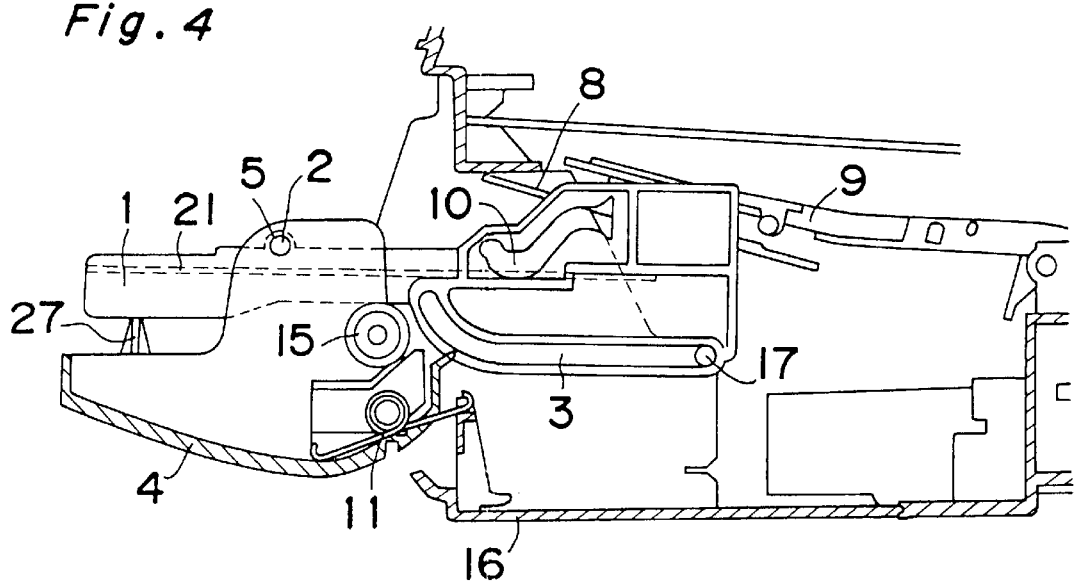
FIG. 4 is a side view of the loading device with the lid body opened.
Figure 5A:
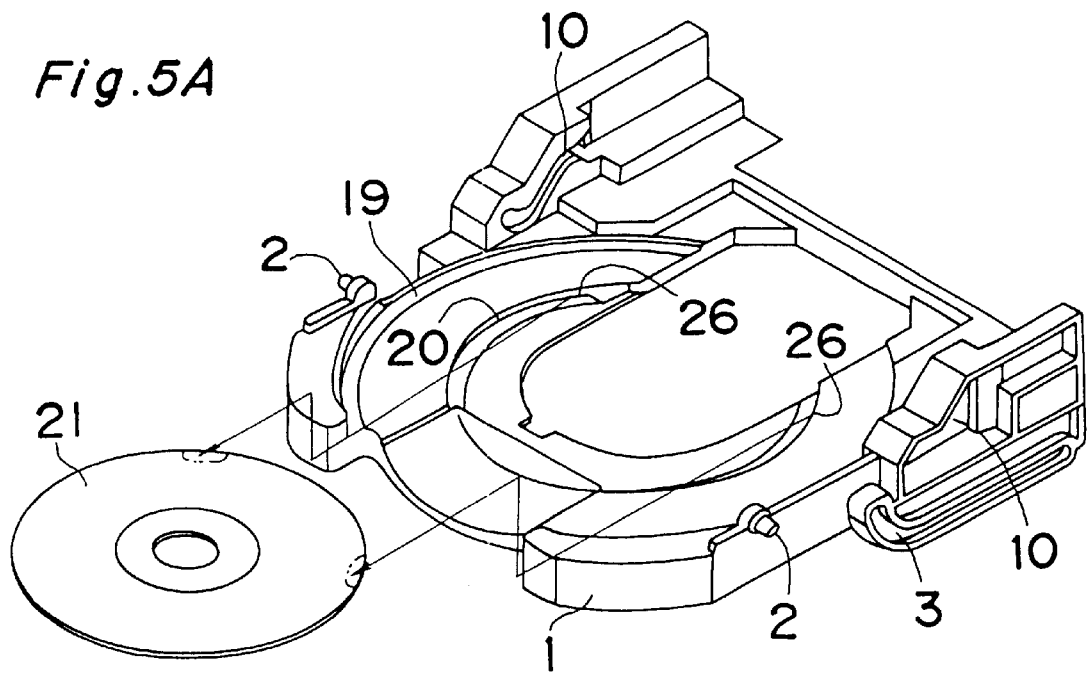
FIG. 5A is a perspective view showing a shape of a tray of the loading device in detail.
Figure 5B:
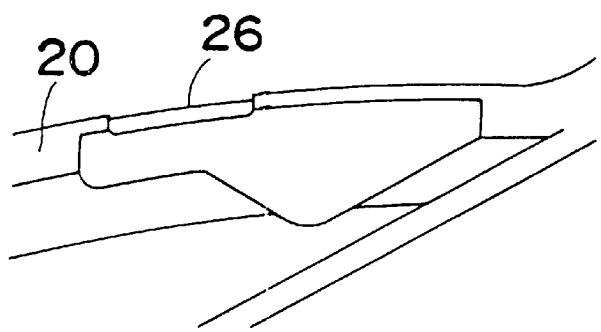
FIG. 5B is an enlarged detailed perspective view of a disc-holding rib of the loading device.
Figure 6:
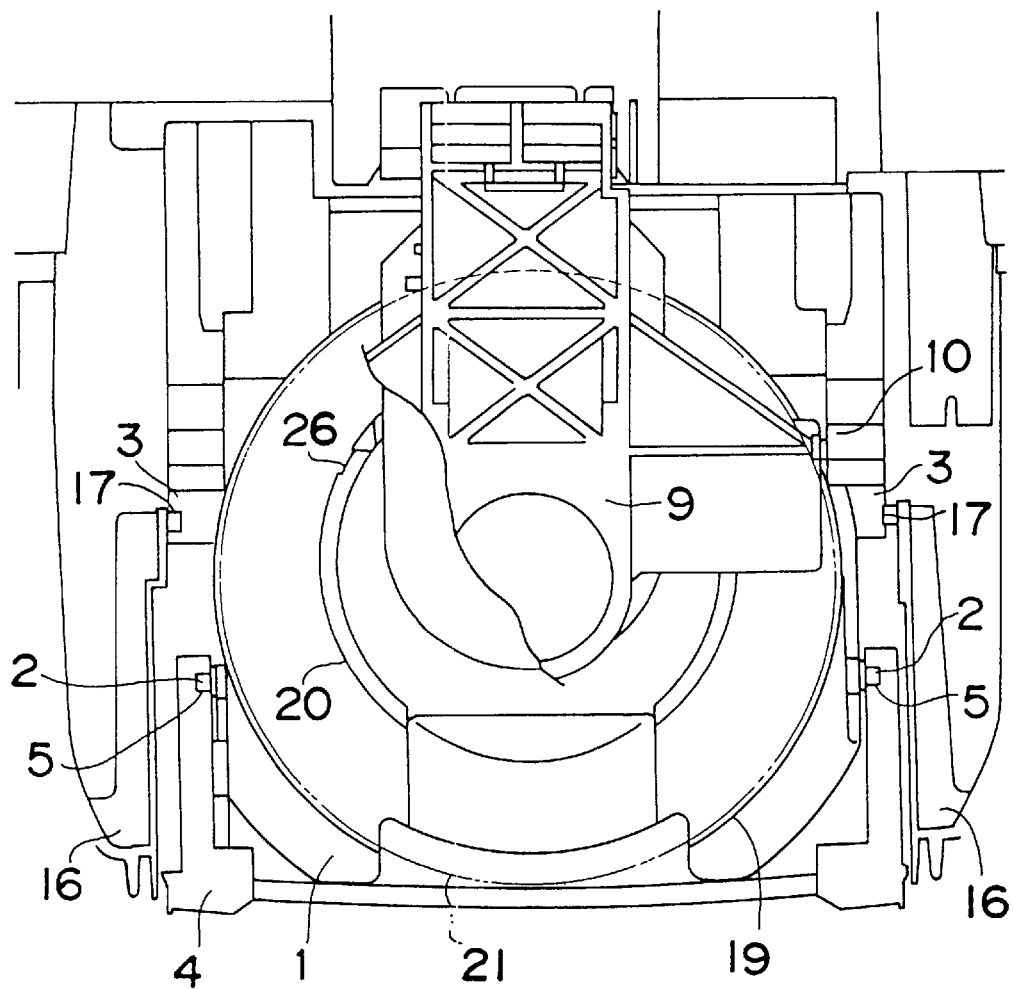
FIG. 6 is a plan view of the loading device.

FIG. 1 shows a disc loading apparatus in a state with a lid body closed and FIG. 2 shows a center portion thereof, while FIG. 3 shows a state when a clamper is raised, FIG. 4 shows a state with the lid body opened, and FIG. 5A shows a shape of the tray 1 while FIG. 5B shows a partial portion thereof.

In FIGS. 1 through 4, reference numeral 1 denotes a tray for carrying a disc 21 between a load starting position and a disc play position; 2 denotes a first supporting part provided in one side of the tray 1; 3 denotes a supporting part guide mechanism formed in the tray 1; 4 denotes a lid body; and 5 a first engaging part provided in the lid body 4 for engaging with the first supporting part 2. Reference numeral 6 denotes a recording/reproducing mechanism; 7 denotes a turntable of the recording/reproducing mechanism 6 for turning the disc 21; 8 denotes a clamper for clamping the disc on the turntable; 9 denotes a holding lever holding the clamper 8; and 10 denotes a holding lever guide mechanism provided in the other side of the tray 1 opposite to the supporting part guide mechanism 3. Reference numeral 11 denotes a lid-opening spring for opening the lid body by its urging force; 15 denotes a pinion; 16 denotes a main body; 17 a second engaging part formed in the main body 16; 18 denotes a gear provided on the main body 16; and 28 denotes a printed wiring board.

As shown in FIGS. 2, 3, 5A, 5B and 6, reference numeral 19 denotes a first disc guide part formed in a periphery of a first disc receiving recess formed in the tray 1 for matching in position a large sized disc with the recording/reproducing mechanism; 20 denotes a second disc guide part formed in a periphery of a second disc receiving recess formed in the first disc receiving recess, where the center of the second disc guide part 20 is slightly shifted rearward with respect to the center of the first disc guide part 19, and 26 denotes a disc-holding rib 26.

Figure 7:
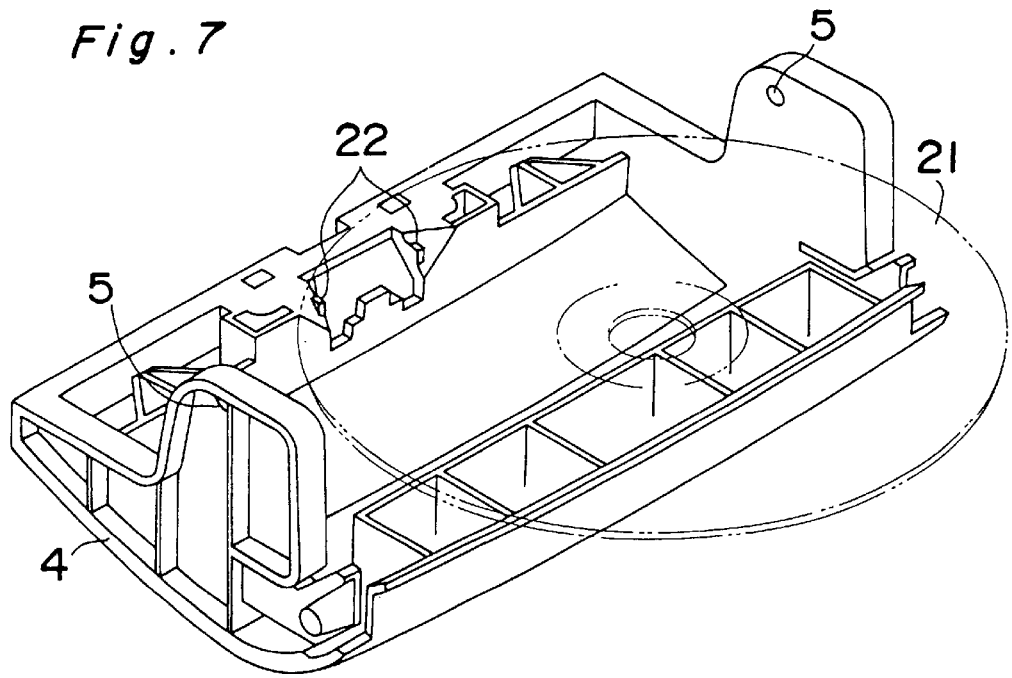
FIG. 7 is a perspective view of the loading device when the lid body is opened.
Figure 8:
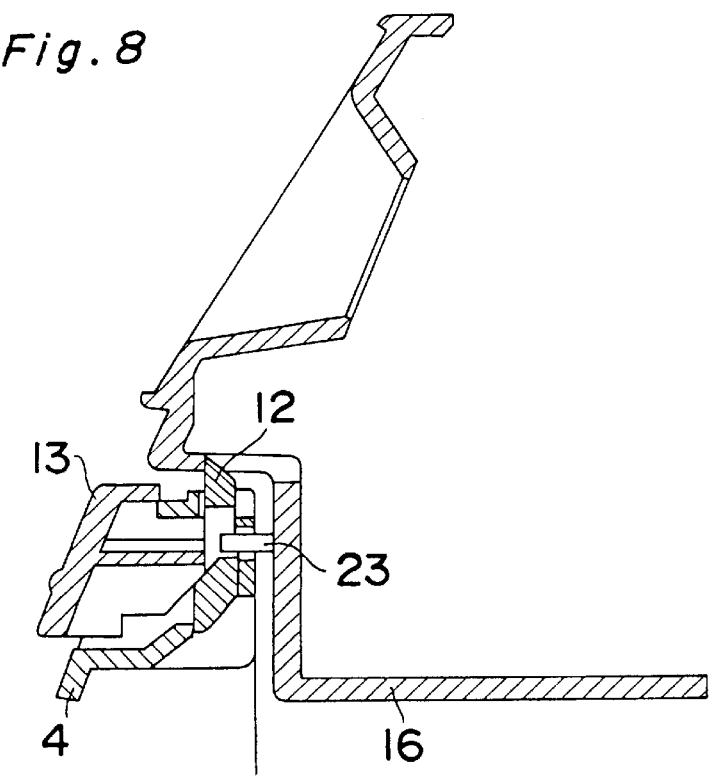
FIG. 8 is a sectional view when an ejection button is not depressed in the loading device.
Figure 9:
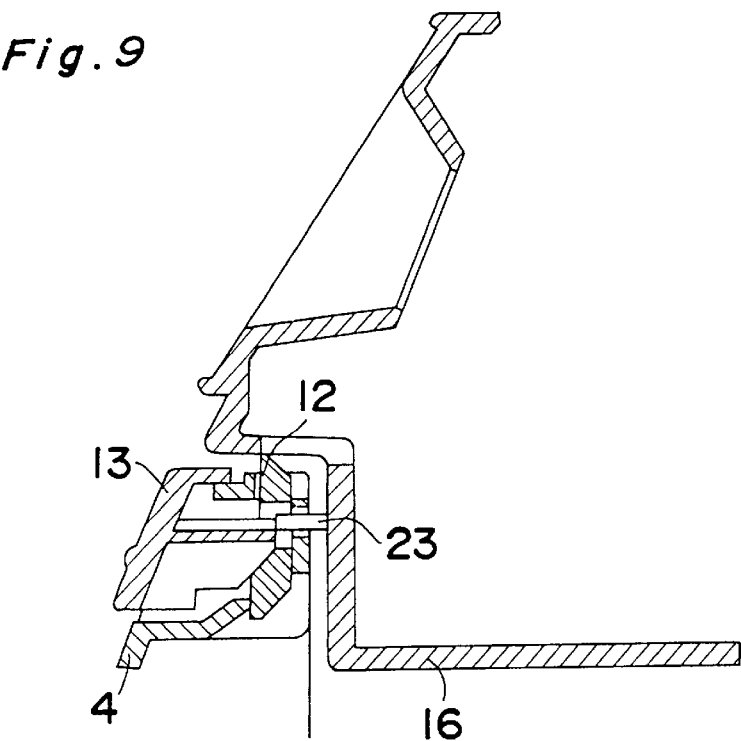
FIG. 9 is a sectional view when the ejection button is depressed thereby to release the lid body from locking.
Figure 10:
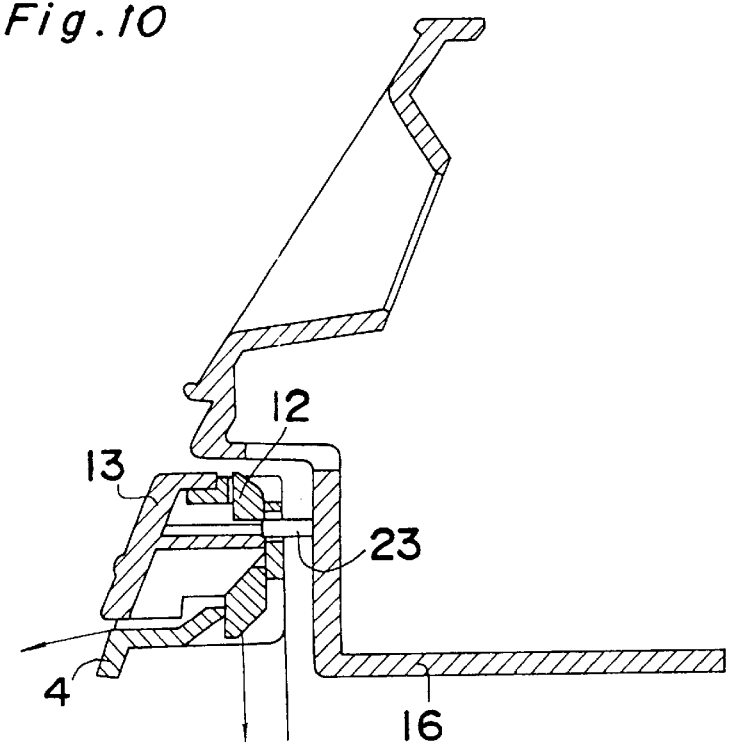
FIG. 10 is a sectional view when the ejection button is depressed thereby to start opening the lid body.

FIG. 7 shows a state of the lid body when the lid body is opened, FIG. 8 shows a locked state between the lid body and the main body 16 when an ejection button is not depressed, while FIG. 9 shows a state when the ejection button is depressed thereby to release the lid body from locking, and FIG. 10 shows a state when the ejection button is depressed thereby to start opening the lid body.

In FIGS. 7 through 10, reference numeral 12 denotes a lid lock lever; 13 denotes an ejection button; 14 a switch; 22 denotes a disc guide part formed in the lid body 4; 23 denotes an ejection button stopper formed in the main body 16; 24 denotes a lever spring urging the holding lever 9 upward; 25 denotes a magnet held by the clamper 8; 26 denotes a disc-holding rib in the second disc guide part 20; and 27 denotes a rib provided at an upper inner side of the lid body 4 for turning ON the switch 14 when the lid is closed.

The following describes relationships in construction among the components of the disc loading apparatus.

In the construction of the disc loading apparatus, the lid body 4 is held by the main body 16 in a pivotally rotatable manner and urged by an urging force of the lid-opening spring 11 toward the lid opening direction. As shown in FIGS. 8 through 10, the lid body 4 is provided with the lid-lock lever 12 which is engaged with the main body 16 to thereby hold the lid body 4 in the closed condition in stable. The lid body 4 is further provided with the ejection button 13 and when the lock lever 12 is depressed by pressing the ejection button 13, the closed condition of the lid body 4 is released. The lid body 4 has the pinion 15 provided thereon via a grease material which is filled in the space between the lid body 4 and the pinion 15. The pinion 15 is engaged with the gear 18 provided on the main body 16 so that the lid body is smoothly opened in the lid opening operation.

The first engaging part 5 defined in the lid body 4 is engaged with the first supporting part 2 provided on the tray 1, so that the tray 1 is pivotally supported by the lid body 4 in a rotatable manner, while the supporting part guide mechanism 3 of the tray 1 is slidably engaged with the second engaging part 17 of the main body 16, so that the moving locus and posture of the tray 1 is appropriately regulated, maintaining a horizontal movement and stable mounting of the disc on the recording/reproducing mechanism.

In order to securely carry either a larger or smaller disc in size compatibly on the tray to and from the turntable 7, the tray 1 is provided with the first and second disc guide recessed parts 19 and 20 for securely holding the discs respectively in constant positions on the tray. The first disc guide part 19 is formed as a first recess in the tray for positioning a larger sized disc thereon while the second disc guide part 20 is formed as a second recess defined in the first recess in a two-stepped manner for positioning a smaller one.

Thus, the disc holding levels in the first and second recesses in height on the tray are different from each other as two stairs in the tray, so that the movement locus of the tray carrying the disc for loading and unloading is non-parallel to the extending direction of the rotary shaft of the turntable 7. Therefore, the center of the first disc guide part 19 is slightly shifted from the center of the second disc guide part 20.

In this construction, since the lid body is manually closed in a pivotal manner so that the tray associated with rotation of the lid body is horizontally moved, therefore when a smaller sized disc is carried in the position defined by the second recess 20, the disc may be detached from the second recess 20 due to changes in posture and vibrations of the tray when the disc is carried and mounted on the recording/reproducing mechanism 6, which may be a failure of correct loading of the disc.

In order to avoid this failure, the tray has a pair of disc holding ribs 26 at right and left rear upper peripheral parts of the second disc guide part 20 as shown in FIG. 5B. The disc holding rib 26 has a flange shape for regulating the smaller sized disc by the upper periphery of the disc guide part 20.

The clamper 8 securely clamps the disc 21 by the magnetic force of the magnet 25 when the disc is disposed on the turntable 7 of the recording/reproducing mechanism 6 and the clamper 8 is moved up and down in a circular arc locus by means of the clamper holding lever 9 which is rotatably held on the main body. The clamper holding lever 9 is moved downward by the regulation of the holding lever guide mechanism 10 provided on the tray 1 and is urged upward all the time by the lever spring 24, so that the clamper holding lever 9 is held up when the tray 1 is unlocked from the playing condition. When the release of the tray from the locked condition is started, the clamper 8 is pushed up by a part of the tray 1 or a part of the disc 21 on the tray.

The operation of the loading apparatus constituted as above will be described with reference to the drawings.

First, the operation of the loading apparatus when loading a disc will be described.

When the disc is placed on the tray 1 drawn out by the opened lid body 4 and then the lid body 4 is closed, the first supporting part 2 of the tray 1 is pressed into the appliance interlockingly with the rotation of the lid body 4. The tray 1 moves tracing an outline of the supporting part guide mechanism 3 engaged with the second engaging part 17 of the main body 16. In the case where the supporting part guide mechanism 3 is a groove curved in a direction opposite to a locus of the first engaging part 5, in the initial stage of the operation, the tray 1 is pressed to move along a straight rear section of the supporting part guide mechanism 3, that is, almost in a horizontal direction. In the latter half of the operation, in a recessed arc-like area of the supporting part guide mechanism 3, the tray retreats with a rear end thereof slightly raised due to a difference from a rotational locus of the lid body 4, and promptly descends after passing a critical point.

Figure 11:
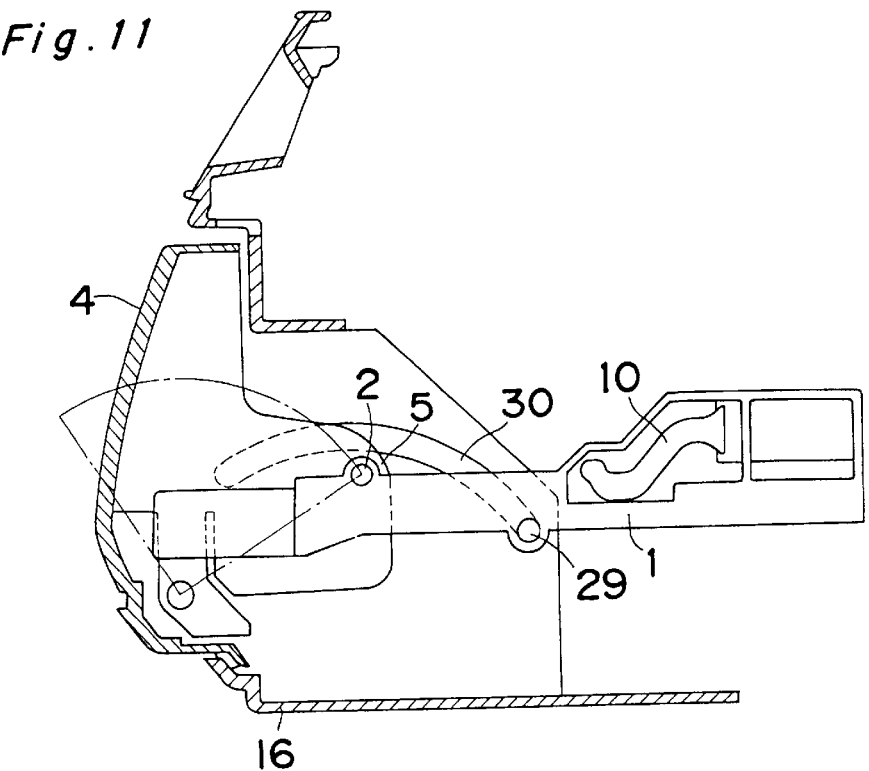
FIG. 11 is a side view of a loading device according to a second embodiment of the present invention in a state with a lid body closed.
Figure 12:
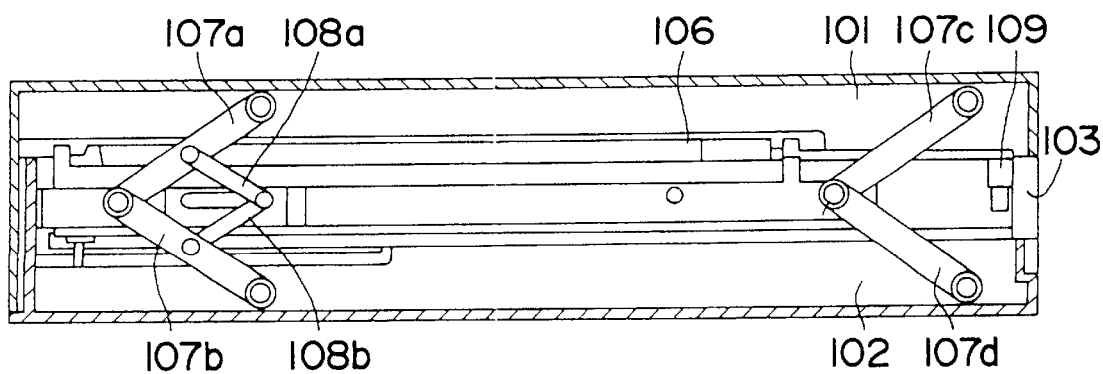
FIG. 12 is a sectional view showing a conventional disc loading apparatus.

If the supporting part guide mechanism 3 curves in the same direction as and nearly approximate to the arc-shaped locus of the first engaging part 5 defined by the rotation of the lid body 4 as shown in FIG. 11, the tray 1 assumes a locus approximate to the rotational locus of the lid body 4 while maintained in a generally horizontal state.

At this operation, the disc 21 on the tray 1 is moved by the disc guide part 22 of the lid body 4 shown in FIG. 7 to the rearward of the apparatus inside the first disc guide part 19 of the tray 1, whereby a shift of the disc from the center of the turntable is reduced. When the disc 21 has a small diameter, the disc is placed at the second disc guide part 20 of the tray 1 to be loaded to the recording/reproducing mechanism 6. In this case, the disc 21 is positionally regulated by the second disc guide part 20 shifted rearward of the apparatus, and accordingly the disc 21 is loaded to the turntable 7 of the recording/reproducing mechanism 6 without generating a positional shift in a front-and-rear direction.

Concurrently with the above loading operation, the clamper-holding lever 9, supported in a rotatable fashion to the main body 16, is pressed down by the holding lever guide 10 of the tray 1, thereby pushing and stably holding the disc 21 loaded to the turntable 7 of the recording/reproducing mechanism 6 by a magnetic force of the magnet 25 held by the clamper 8. When the lid body 4 is completely closed in the above loading operation, the switch 14 is turned ON by the rib 27 formed in the lid body 4 and at the same time, the lid body 4 is locked by the lid lock lever 12. The disc 21 is thus set in a recordable/reproducible condition.

Now, the operation of detaching the disc will be described.

When the ejection button 13 is pressed from a state of FIG. 8 wherein the ejection button is not pressed, the lid lock lever 12 is depressed, undergoing a state shown in FIG. 9 to release the lock, in a range before the ejection button 13 butts against the ejection button stopper 23 of the main body 16 as shown in FIG. 10 and the lid body 4 is released.

Thereafter, if a pressing force acting on the ejection button 13 is removed, the lid body 4 starts to be opened by an opening force of the lid-opening spring 11. If the ejection button 13 is continuously pressed even after hitting the ejection button stopper 23 of the main body 16, the lid body 4 is opened so as to butt against the ejection button 13 by the opening force of the lid-opening spring 11. The ON state of the switch 14 by the lid body 4 is canceled at this moment, and simultaneously, the turntable 7 of the recording/reproducing mechanism 6 is braked thereby to attenuate the rotation of the rotating disc 21 to prevent the disc from slipping off from on the tray 1 when the lid body is opened. Then, the lid body 4 is opened at low speed without shocks due to a damping effect provided by a highly viscous grease filled in a shaft part of the pinion 15 and by the opening force of the lid-opening spring 11.

When the clamper 8 is pushed up by the tray 1, drawn out in association with the above-described opening operation of the lid body 4, the clamping of the disc 21 by the magnetic force of the magnet 25 held by the clamper 8 is released, as indicated in FIG. 3. After the clamping is released, the clamper 8 is raised by the lever spring 24 so as not to interfere with the tray 1 when the tray 1 is drawn out. Since the holding lever 9 is guided by the holding lever guide 10 set in the tray 1, the holding lever 9 is prevented from being abruptly raised by the lever spring 24, and smoothly moves up.

The disc-holding rib 26 formed in the second disc guide part 20 of FIGS. 5A and 5B restricts the disc 21 so that it will not stray from the disc guide part 20 in case the tray 1 oscillates or vibrates during the above loading/detaching operation.

In the first embodiment of the present invention, since the members are constituted to interlock with each other primarily at the rotating time, the operation is reliably secured in the simple structure and the small moving amount allows the use of the spring to drive the apparatus and the loading apparatus is accordingly compact in size. The disc never deviates from the guide part and thus is not subject to shocks even when released from the clamper. In comparison with the prior art loading apparatus, the loading apparatus of the embodiment becomes simple, compact and high-quality, and operates with high reliability.

Second Embodiment

FIG. 11 shows a loading apparatus according to a second embodiment of the present invention. Reference numeral 29 denotes a shaft as a second supporting part set in the tray 1; and 30 denotes a second engaging part at the side of the main body 16 which is an arc-shaped groove guided by the second supporting part 29 and curved in the same direction as and almost approximate to an arc-shaped locus of the first engaging part 5 of the lid body 4 because of the rotation of the lid body 4.

In the thus-constituted loading apparatus, the tray 1 traces/moves approximately the same rotational locus of the first supporting part 2. Since a sliding resistance of the first and second engaging parts 5, 30 to the moving tray 1 works in the same direction because of the above locus, no unexpected force is applied to the tray 1, thus lightening the operation load.

In the construction of the second embodiment, the supporting part guide mechanism provided in the tray is a shaft 29 while the second engaging part formed in the main body is an arc-shaped groove 30 guided by the shaft 29. The arc-shaped groove 30 curves in the same direction as and nearly approximate to the arc-shaped locus of the first engaging part 5 defined by the rotation of the lid body. By this arrangement, the tray slides schematically parallel without forcing a resistance between the groove and the shaft, and the tray is allowed to move smoothly.

Accordingly, the loading apparatus of the embodiment achieves the smooth slide of the tray.

It is to be noted here that, although the embodiments are explained with respect to the disc loading apparatus using a disc as a recording medium, the present invention is not limited to this construction, and other types of recording medium such as a tape cassette can be applicable for the essential concept of the present invention.

As described above, in the disc loading apparatus of the present embodiment, the tray 1 carries the disc 21 between a disc loadable position where the disc can be loaded and a disc play position where the disc can be played for recording/reproducing operation. The lid body 4 is pivotally rotatable and is disposed in front of the recording and/or reproducing mechanism 6 in a main body 16 of the recording and/or reproducing apparatus in a generally vertical posture when in its closed state and in a generally horizontal posture when in its opened state. By means of the guide mechanism, the tray 1 is guided, in association with the opening/closure of the lid body 4, between the loadable position when the lid body is in the open state and the play position when the lid body is in the closed state. The guide mechanism guides the tray so that the loadable position is located just above the lid body in its open state while the play position is located just above the recording and/or reproducing mechanism (6) where the disc is to be mounted thereon when the lid body is in the closed state.

The guide mechanism is comprised of the first supporting part 2, supporting part guide mechanism 3 formed in the tray, first engaging part 5 formed in the lid body for engaging with the first supporting part 2 in a freely rotatable fashion, thereby interlocking the tray with the rotation of the lid body. The guide mechanism further includes the second engaging part 17 integrally formed with the main body, which guides the supporting part guide mechanism 3 in a slidably movable fashion. The second engaging part 17 and the supporting part guide mechanism 3 are held in such a relation of relative movement as to regulate the movement of the tray in an arc-shaped locus in correspondence to a locus of the first engaging part 5 and the first supporting part 2 in accordance with the rotation of the lid body while maintaining the tray in a substantially horizontal posture to load the disc on the recording/reproducing mechanism.

The tray can be transferred while being controlled to keep the substantially horizontal posture to be located between the loadable position just above the lid body for loading the disc when the lid body is in the open state and the play position where the disc is mounted or the recording/reproducing mechanism to be played when the lid is in the closed condition.

The supporting part guide mechanism 3 provided in the tray 1 includes a front generally arc-shaped groove portion and a rear straight extending groove portion. The second engaging part 17 is integrally formed with the main body and is a shaft engaged in the groove guide 3 thereby to be guided by the sliding movement thereof. The arc-shaped groove portion curves in an opposite direction, i.e., having a reverse curvature to the arc-shaped locus of the first engaging part 5 defined by the rotation of the lid body 4. By this arrangement, when the lid body is opened, a rear end of the tray is moved higher than a front end thereof in the initial stage of the operation, so that an interference between a movement locus of a clamp hole of the disc and the turntable of the recording/reproducing mechanism 6 is avoided, with the effect that the disc is smoothly loaded and detached to and from the turntable.

Alternatively, as shown in FIG. 11, the supporting part guide mechanism provided in the tray is a shaft 29 while the second engaging part formed in the main body is an arc-shaped groove 30 to be guided by the shaft 29. The arc-shaped groove 30 curves in the same direction, i.e., having nearly the same curvature as that of and nearly approximate to the arc-shaped locus of the first engaging part 5 defined by the rotation of the lid body. By this arrangement, the tray slides schematically parallel without forcing a resistance between the groove and the shaft, and the tray is allowed to move smoothly.

In a modified example of the first embodiment, a disc is used as a recording medium, and a turntable 7 is disposed horizontally for a disc reproducing mechanism 6 in a disc reproducing apparatus. The tray carries the disc thereon, thereby moving the disc from a loadable position to a reproducible position. The lid body 4 is pivotally openable and is constituted in a main body nearly in front of the disc reproducing mechanism and disposed in an almost vertical posture when the lid is in the closed state. The tray is moved by guide means from the loadable position to the reproducible position in association with the opening/closure of the lid body, and the clamper-holding lever 9 for holding the clamper which securely presses the disc onto the turntable at the reproducible position when in the lid closed condition.

The clamper-holding lever 9 is pivotally supported to the main body in a freely movable fashion in a vertical direction in association with the movement of the tray. The guide means is so constituted as to position the tray over the lid body to load the disc when the lid is open and bring the tray to a position where the disc is placed over the recording/reproducing mechanism to be recorded/reproduced when the lid is closed. In association with the transfer of the disc, the disc loaded to the reproducible position can be held stably on the tray.

In the preferred embodiment of the disc loading apparatus, the tray is associated with the lid body which is rotatable in opening and closing operation so that the disc is carried by the tray in a non-linear locus to be mounted on the recording and/or reproducing mechanism.

In this construction using, e.g., a CD, in order to playback the disc in the recording and/or reproducing mechanism, the disc is needed to be clamped onto the turntable of the recording and/or reproducing mechanism by means of the clamper, the clamper is associated with the movement of the tray by means of the clamper holding lever 9 and the holding lever guide mechanism 10. However, when the disc is detached, the clamping of the clamper is to be unlocked. Therefore, in the clamp releasing mechanism using an urging force by a spring, the force by the spring urging the tray upward is all the time active also during the disc playing condition. Thus, the gap between the disc and the tray is possibly reduced due to changes in time lapse or difference in spring forces, rubbing against each other, resulting in causing an erroneous playback or undesirable reproduction due to damage or the like.

In order to eliminate this problem, in the preferred embodiment of the present invention, when the tray is moved to the loadable position, the clamper pressing the disc is pushed up by a disc loading face of an upper face of the tray or an upper face of the disc on the tray, so that the disc is released from clamping. Therefore, the clamper can be separated from the turntable with a small load without shocks.

In this arrangement, when the lid body is opened during the disc playing operation, the disc is forced to be raised up from the turntable of the recording and/or reproducing mechanism prior to the stop of the rotation of the disc. Therefore, the disc may be rotated in the tray by its rotational inertia, resulting in removal from a disc regulation recess (19, 20) formed in the tray or damaging the recording and/or reproducing surface of the disc, causing an erroneous reproduction.

In order to avoid this problem, in the preferred embodiment, the lid body 4 is provided with a projection such as a rib 27 and a switch 14 attached to a printed wiring board 28 fixed inside the main body, so that it is electrically detected only when the lid body is closed, thereby to supply electric power to the recording/reproducing mechanism. Otherwise, the recording/reproducing mechanism is accordingly effectively refrained from operating when the lid is opened. Meanwhile, it is detected that the lid body is open when the lid body is forcibly opened during the reproduction operation, and the turntable of the recording/reproducing mechanism is braked to attenuate the rotation of the rotating disc, whereby the disc is prevented from slipping off from the tray when the lid is opened.

Furthermore, in order to reduce the apparatus in size, the lid body is provided with an ejection button 13 for unlocking the lid body, so that the lock of the lid body is released by depressing the ejection button 13. In this construction, when the ejection button is depressed, the lid body is pushed toward the main body 16 due to the reaction of the restoring force of the ejection button, and when the depressing of the ejection button is released, the lid body is started to be opened. However, in this construction, in spite of the operation of the ejection button, the ejection button may be restored and the lid body lock lever 12 being operated by the ejection button is restored prior to the opening of the lid body, and therefore the lock of the lid body can not be released in some cases.

In order to avoid this problem, as shown in FIG. 8, the lock lever hook 12 is unlocked in a range before the ejection button 13 butts against a stopper 23 formed in the main body, with a gap defined between the lid body and the ejection button so that the lid body and the lock lever hook are opened by a lid-opening force to butt against the ejection button after the ejection button butts against the stopper. Thus, the lid body is prevented from being locked again by the returning lock lever 12 when the load applied to the ejection button is removed.

Besides, since the center of a circle of a recessed guide part 19 formed in the tray for the larger sized disc is shifted rearward from the center of the turntable of the recording/reproducing mechanism, a shift from the center of the turntable when the disc is loaded and/or detached to the turntable of the recording/reproducing mechanism is thus corrected, so that the disc is smoothly loaded/unloaded. By this rearward offset of the recessed part, the mounting locus of the disc onto the turntable is made non-parallel to the rotational axis of the turntable, which improves the degree of freedom in design of the tray movement locus.

Moreover, as shown in FIG. 7, the lid body is provided with the guide part 22 for regulating the movement of the disc carried on the tray to the rearward of the apparatus within a range of the disc guide part on the tray when the lid body is closed, to thereby correct a displacement of the disc from the center of the turntable of the recording and/or reproducing mechanism when the disc is loaded and/or separated to/from the turntable. Thus, the disc can be loaded and/or unloaded smoothly, improving the accuracy in loading and detaching the disc on and from the recording/reproducing mechanism.

In this arrangement, when the rotatable lid body is manually closed to move the tray associated therewith for carrying the disc to be mounted on the recording and/or reproducing mechanism, there may be a case that the disc is removed from the guide recess formed in the tray due to a change in posture of the tray and vibrations thereof, resulting in erroneous mounting of the disc.

In order to avoid this problem, as shown in FIGS. 5A and 5B, the depth of the disc guide recessed part is made equal to or slightly larger than the thickness of the disc and a flange-like rib 26 is formed at an upper part of the disc guide recessed part of the tray, so that the disc carried on the tray is prevented from slipping out of the disc guide recessed part during the loading operation.

As is described hereinabove, the present invention provides the loading apparatus for recording media in a recording/reproducing apparatus having the horizontally arranged recording/reproducing mechanism. More specifically, the loading apparatus of the invention includes the tray for carrying the recording medium thereon to move the recording medium from the loadable position to the recordable/reproducible position, the lid body arranged in a generally vertical posture in the closed state thereof and constituted in the main body nearly in front of the recording/reproducing mechanism, and includes the guide means for moving the tray between the loadable position and the recordable/reproducible position. The guide means is so constituted as to position the tray, in association with the opening/closure of the lid body, over the lid body to load the recording medium when the lid is open and bring the tray to a position where the recording medium is placed on the recording/reproducing mechanism to be recorded/reproduced when the lid is closed. Therefore, the loading apparatus becomes simple, compact and high-quality and operates with high reliability.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. A loading apparatus for loading a disc used in a disc reproducing apparatus having a turntable horizontally disposed for a disc reproducing mechanism, said loading apparatus comprising:

a tray for carrying the disc placed thereon and thereby moving the disc between a disc loading position where the disc is to be loaded and a disc play position where the disc is to be played for reproducing operation;

a rotatable lid body disposed in front of said disc reproducing mechanism in a main body of the disc reproducing apparatus in a generally vertical posture when in a closed state of said lid body and in a generally horizontal posture when in an opened state of said lid body;

a guide mechanism for guiding movement of said tray, in association with the opening/closing movement of said lid body, between the disc loading position when said lid body is in the open state and the disc play position when the lid body is in the closed state, wherein said guide mechanism guides said tray so that the disc loading position is located just above said lid body while in its open state, while the disc play position is located just above the disc reproducing mechanism where the disc is to be mounted thereon;

a clamper for securely clamping the disc onto the turntable at the disc play position; and a clamper-holding lever for holding said clamper, which is pivotally supported on the main body and is movable in a vertical direction in association with movement of said tray, wherein, when said tray is moved to the disc loading position, said clamper is pushed up by a disc load face of an upper face of said tray, or by an upper face of the disc disposed on said tray, so that the disc is released from a clamped condition on said tray.

2. The loading apparatus as claimed in claim 1, wherein said lid body is provided with a projection and a switch attached to a printed wiring board fixed inside the main body, for electrically detecting the condition when said lid body is closed, to thereby supply electric power to the disc reproducing mechanism for reproducing the disc, and when said lid body is forcibly opened during the reproduction operation, electrically detecting the condition when said lid body is opened so that the turntable of the disc reproducing mechanism is braked to attenuate rotation of the rotating disc.

3. The loading apparatus as claimed in claim 1, wherein said lid body has an ejection button and a lock lever which is unlocked in a range before said ejection button butts against a stopper formed in the main body, characterized in that a gap is defined between said lid body and said ejection button so that said lid body and said lock lever are opened by a lid-opening force to butt against said ejection button after said ejection button butts against the ejection button stopper.

4. The loading apparatus as claimed in claim 1, wherein said tray has a first circular recessed part formed therein for regulating a large sized disc and a center of said first recessed part is shifted rearward from a center of the turntable when said tray is positioned in the play position for reproducing operation.

5. The loading apparatus as claimed in claim 4, wherein said lid body is provided with a guide part for moving the disc carried on said tray to the rear of the apparatus within a range of said first recessed part formed in said tray when said lid body is closed.

6. The loading apparatus according to claim 5, wherein said tray has a second circular recessed part formed therein for regulating a small sized disc, said second circular recessed part having a flange-like rib formed at an upper periphery thereof.

\* \* \* \* \*